(No Model.)
L. S. WOODBURY.
CASING FOR ELECTRIC OR OTHER APPARATUS.
No. 423,014. Patented Mar. 11, 1890.
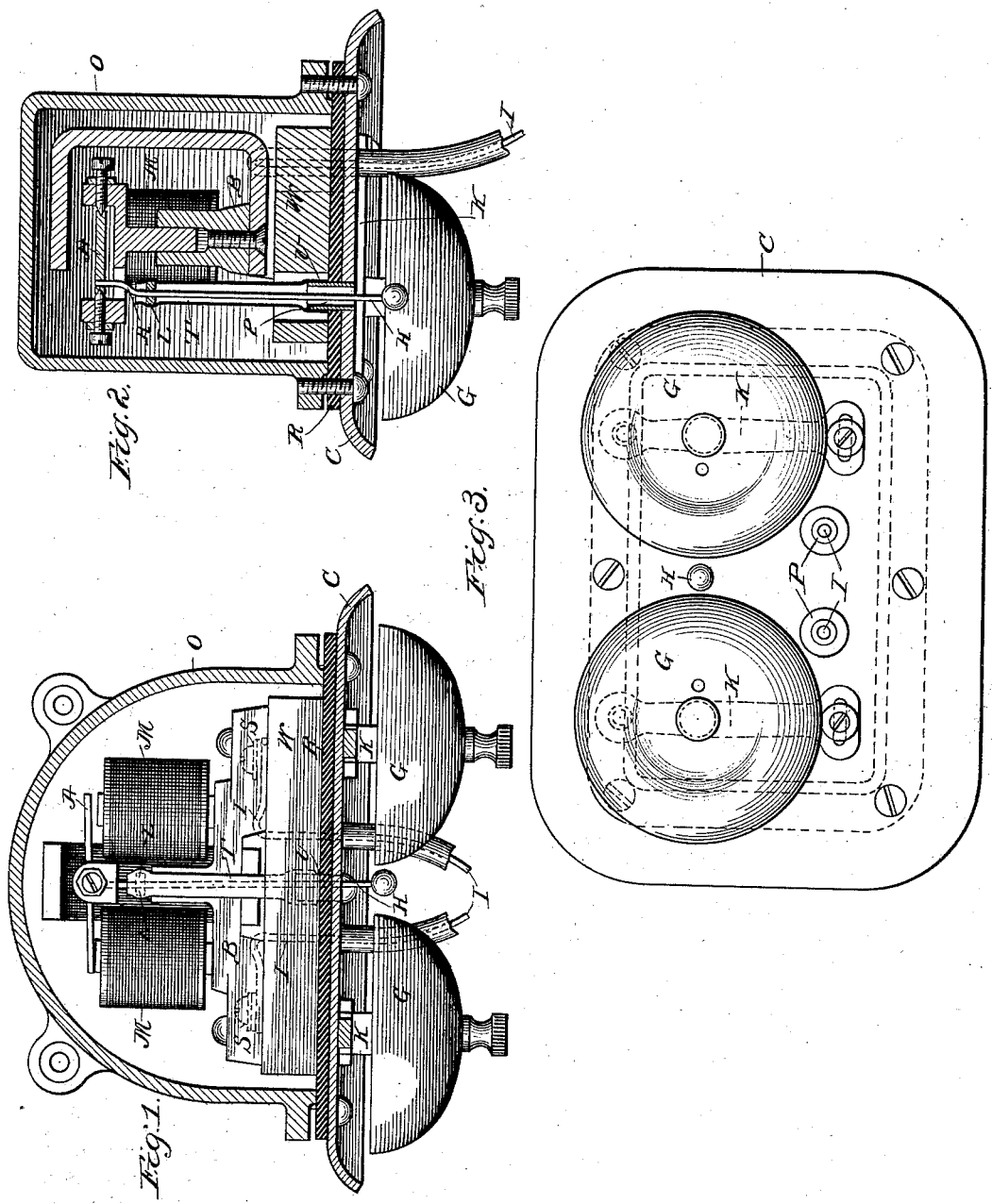
Witnesses.
Wm. J. Rheem
Wm. H. Scott
Inventor.
L. S. Woodbury
By Raymond & Veeder
Att'ys

UNITED STATES PATENT OFFICE.

LEANDER S. WOODBURY, OF CALUMET, MICHIGAN.

CASING FOR ELECTRIC OR OTHER APPARATUS.

SPECIFICATION forming part of Letters Patent No. 423,014, dated March 11, 1890.

Application filed May 22, 1889. Serial No. 311,731. (No model.)

*To all whom it may concern:*

Be it known that I, LEANDER S. WOODBURY, of Calumet, in the county of Houghton and State of Michigan, have invented certain new and useful Improvements in Casings or Shields for Electric and other Apparatus, of which the following is a specification.

The specific purpose of my invention is to provide a casing for an electric or pneumatic signal-bell, which shall be practically airtight, and hence dust and moisture proof, the bell or bells proper, however, being left uncovered, so that the transmission of their sound will not be interfered with. By this means the bell is adapted for use in mines or similar damp or dusty places, where it would ordinarily be soon rendered inoperative.

My invention consists in the parts and combinations hereinafter described and claimed.
In the drawings I have shown my improvement in connection with an ordinary electric signal-bell, substantially like that commonly used in connection with a telephone.

Figure 1 is a front view of the bell, the casing being cut open to show the interior. Fig. 2 is a cross-section of the same. Fig. 3 is a plan view of the under side.

As the actuating mechanism of the bell is of the usual sort, a brief enumeration only, designating the various parts, will be necessary.

A, Fig. 1, is the armature, which, being pivoted at its center and extending over the cores of the magnets M M, is put in motion and vibrates the attached arm H whenever the electric currents entering by the wires I I are sent through the coils.

The magnets M M are mounted on a bracket B, which is secured to the block W, the latter being in turn secured to the plate C, which forms part of the casing.

S S are the binding-screws which connect the wires I I to the coil-wires of the magnets M M. The gongs G G are secured to the outside of plate C by suitable brackets K. The part O and plate C, which form the casing, are secured to each other in any convenient manner, the joint between them being made tight by a rubber gasket R or equivalent means.

To seal the opening P, through which the hammer-arm H passes, without interfering with the vibratory motion of said arm, I employ a tube T, (*vide* Figs. 1 and 2,) of rubber or other flexible material, surrounding the arm H, one end of said tube surrounding the opening P and forming a tight joint with the casing, and the other end forming a tight joint with the arm H, preferably at a point as near its center of motion as possible. I make the tube T extend from the casing toward the center of vibration of the arm H, so that it may be attached to the arm near its center of vibration, where the motion is very slight. By this means the movement of the tube T is very slight and its durability assured, and the freedom of vibration essential to the satisfactory action of an electric bell is not interfered with.

The preferred mode of making the joints between the tube and the casing and arm, respectively, as shown in the drawings, is to fit tightly in the opening P a short piece of metal tubing, so as to form an inwardly-projecting flange U, and to affix a collar L to the arm H near its inner end. The tube T, being then stretched over the collar L and flange U, will hermetically seal the opening P. The material of which the casing is made will of course depend on circumstances. If used in a damp place, some non-corrosive metal like brass would be most suitable.

While I have shown my invention as applied to a signal-bell, it is obvious that it is capable of other uses—as, for example, the inclosing of clock-works or any mechanism actuating or actuated by a vibratory arm.

I claim—

The combination, with a casing and mechanism inclosed therein, of a vibratory arm extending from within outside the casing, a collar on said arm near its center of vibration, an inwardly-projecting flange surrounding the opening through which the arm passes, and a flexible tube surrounding said arm and fitted at its ends to said collar and flange, substantially as described.

LEANDER S. WOODBURY.

Witnesses:
CURTIS H. VEEDER,
L. A. WOODBURY.